March 2, 1954 J. W. CARTINHOUR Re. 23,795

ELECTRIC AIR HEATER

Original Filed May 4, 1950 2 Sheets-Sheet 1

Inventor
JOHN W. CARTINHOUR
E. Francis Wentworth Jr
Attorney

March 2, 1954 J. W. CARTINHOUR Re. 23,795
ELECTRIC AIR HEATER
Original Filed May 4, 1950 2 Sheets-Sheet 2
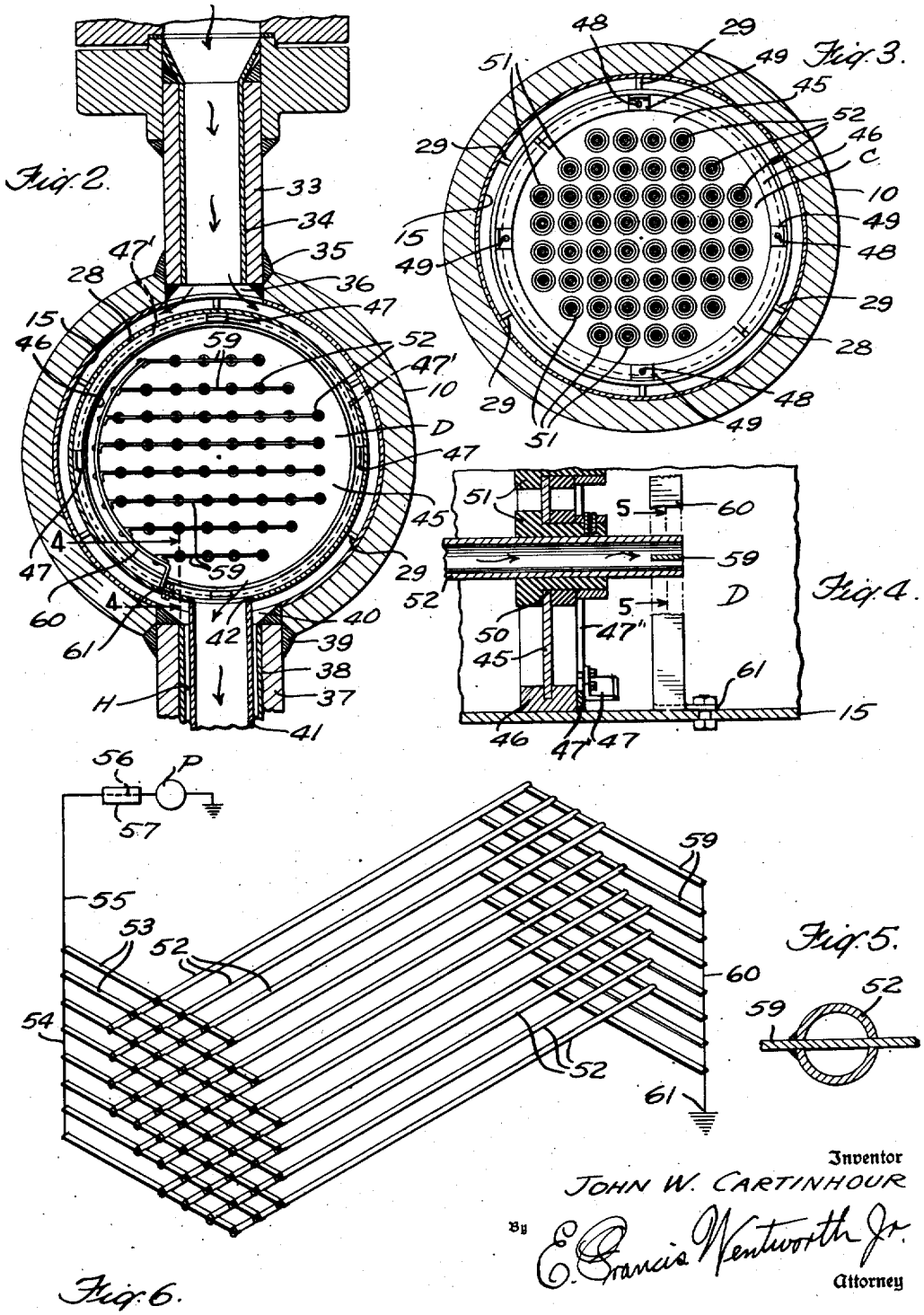
Inventor
JOHN W. CARTINHOUR
By E. Francis Wentworth Jr.
Attorney Reissued Mar. 2, 1954 Re. 23,795

UNITED STATES PATENT OFFICE 23,795

ELECTRIC AIR HEATER

John W. Cartinhour, Baldwin, N. Y., assignor to Foster Wheeler Corporation, New York, N. Y., a corporation of New York Original No. 2,619,579, dated November 25, 1952, Serial No. 159,937, May 4, 1950. Application for reissue December 4, 1953, Serial No. 396,363

8 Claims. (Cl. 219—39)

Matter enclosed in heavy brackets [ ] appears in the original patent but forms no part of this reissue specification; matter printed in italics indicates the additions made by reissue.

This invention relates to a heat exchanger for air or other fluids and more particularly to an electric air heater.

In certain high pressure, high temperature service, utilizing large quantities of air for relatively short periods of time, for example only, the supply of air at approximately 1040° F. and 3000 p. s. i. g. with entering conditions at 650° F. and 3030 p. s. i. g., the heater must be capable of being placed in service at its full capacity in a matter of a few seconds and must maintain steady conditions thereafter.

This requires a heater having unique features which are objects of this invention and which may be grouped as follows.

(1) Features enabling the exchanger to perform according to requirements;

(2) Features providing for safe operation; and (3) Features contributing to an economic solution of the problem.

Single features do not necessarily contribute to only one of the groups and in several cases a feature contributes to all three.

The necessity for rapid starting combined with steady operating conditions is met in this invention by utilizing electric power as a source of heat. It can be made available with extreme rapidity and its rate of input can be controlled with a high degree of accuracy. Further, in order to reduce the time required to make heat available to a minimum, the heat storage capacity of the heating elements must be relatively small. This condition is satisfied by the use of high voltages and light resistive conductors. Moreover the relatively small mass of these resistive conductors alone contributes to the economy of the structural design.

Although the primary purpose of the heating elements is to heat the air or other fluid to the desired temperatures, it is important that they accomplish their function safely. Therefore, these elements must be arranged so that the danger of overheating is minimized. For this reason the heating elements utilized herein are tubular in form and arranged so that the air or other fluid to be heated flows through them. The pressure drop through the tubular elements is sufficient to assure even distribution of flow through the various tubes, and the flow rate per tube is high enough to provide relatively high heat transfer coefficients. Thus the use of small, light heating elements contributes to all three of the desirable unique features grouped hereinabove.

The tubular heating elements are enclosed in a metallic shell, in a manner to be described, to provide appropriate distribution and flow of air through the elements. Since all metals lose strength at elevated temperatures, it is desirable to keep the sheell temperatures as low as possible. For this reason the cool air or fluid to be heated is directed in such a way inside of the shell, by arrangements to be described, as to keep the shell at a uniformly low temperature. This reduces the cost of the shell by reducing its required thickness and, also, by eliminating the necessity for use of high-alloy materials for the shell. It also contributes to the safety of the shell or vessel by reducing thermal stresses which under the rapid starting conditions mentioned herein might eventually cause cracking of the shell and a serious operating failure. In addition, the maintance of uniform shell temperature at gasket joints in the shell reduces the possibility of air or fluid leakage through them.

Other objects and novel features of the invention include the provision of structure adaptable for providing heat exchange between different fluids at different temperatures and also of structure adaptable for electrical heating of fluids other than air having proper dielectric properties.

Other objects and novel features will become apparent from the following specification and accompanying drawing wherein:

Fig. 2 is a transverse vertical section taken along line 2—2 of Fig. 1 and viewed in the direction of the arrows;

Fig. 3 is a transverse vertical section taken along line 3—3 of Fig. 1 and also viewed in the direction of the arrows;

Fig. 4 is a fragmentary longitudinal section on an enlarged scale taken along line 4—4 of Fig. 2 illustrating details of construction, and, also, viewed in the direction of the arrows:

Fig. 5 is a fragmentary transverse section taken along line 5—5 of Fig. 4 also viewed in the direction of the arrows; and Fig. 6 is an isometric view in diagrammatic form of the heating tube arrangement and electric circuit involved.

Figure 1:
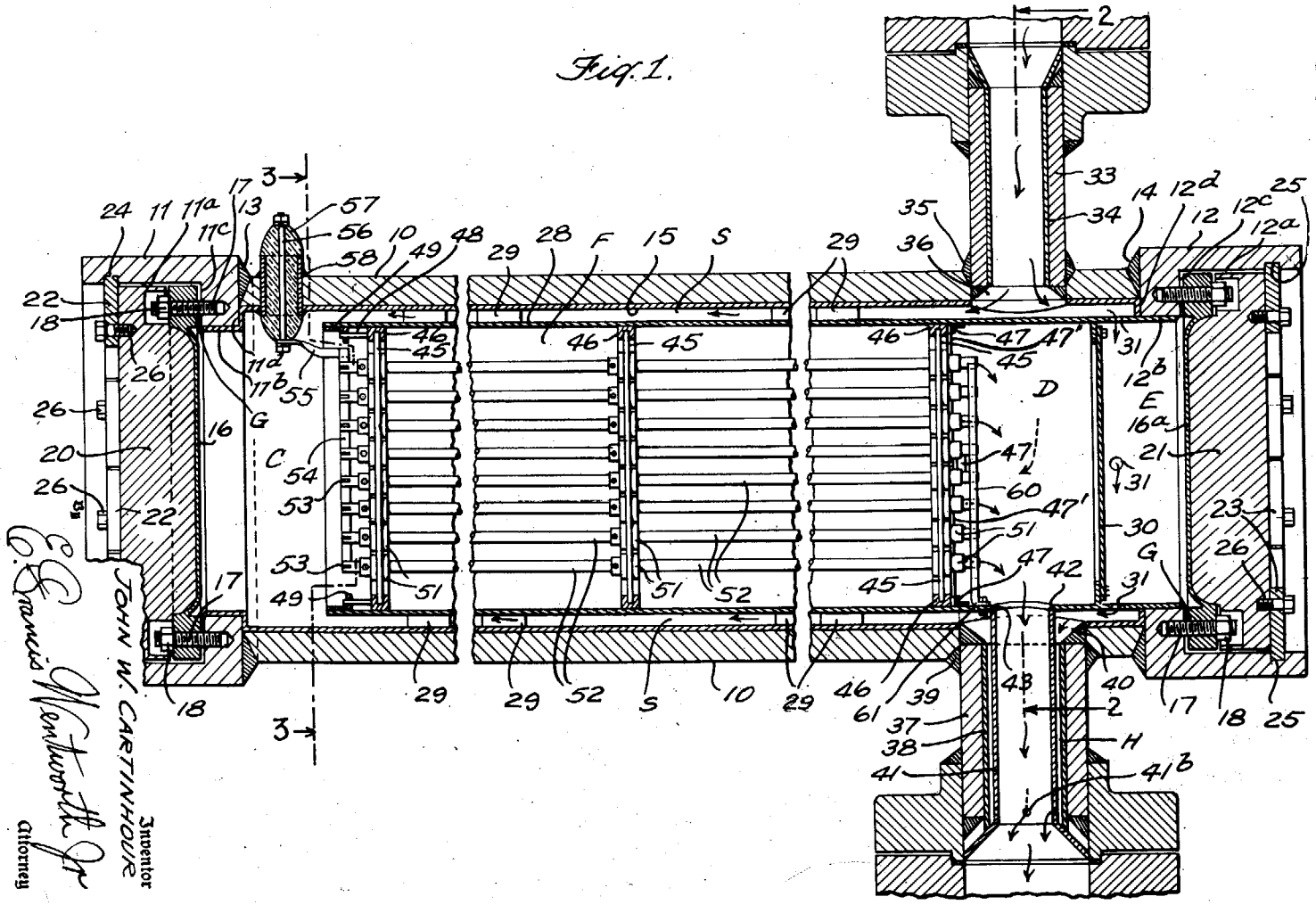
Fig. 1 is a longitudinal view, partially in section, of a heater embodying the invention.

Referring to the drawings, 10 denotes a hollow shell of metal or other desirable material which is provided at its opposite ends with tubular end members 11 and 12 of larger overall cross sectional dimensions than that of shell 10 and each having two differently dimensioned internal portions 11a, 11b and 12a, 12b respectively each different from that of the internal dimensions of shell 10 to define the respective shoulders 11c, 11d and 12c, 12d. The end members 11 and 12 are secured respectively to the opposite ends of shell 10 as by welding or the like at 13 and 14.

The inner wall of shell 10 is provided with a snugly fitting tubular liner 15 preferably of sheet metal. This liner 15 is optional if shell 10 is itself of metal suitable for the intended purposes. Metal closure members 16, 16a fitting within the recesses 11a and 12a with sealing gaskets G abut the respective shoulders 11c and 12c and are tightened against the gaskets G and secured in place as by bolts and nuts 17, 18. External reinforcements 20, 21 are provided for the respective closure members 16, 16a and these are held securely against the latter by segmental locking rings 22, 23 fitting edgewise respectively in the annular grooves 24, 25 in portions 11a and 12a of members 11 and 12 and bolted to the respective reinforcements 20, 21 by bolts 26.

A tubular shell 28 of sheet metal or the like having smaller cross sectional external dimensions than the inner cross sectional dimensions of liner 15 or inner dimension of shell 10 is located in a centralized position within shell 10, one end projecting into the portion 12b of end member 12. The shell 28 is provided at various external points with spacing fins or lugs 29 which centralize it relative to liner 15 and shell 10 throughout its length so that shell 28 and lining 15 define an annular space S extending from the shoulder 12d to the far end of shell 28 where the space S communicates with a chamber portion C of shell 10.

A transversely extending partition 30 divides the inner shell into a tube bearing compartment D to one side of the partition 30 and a cold air space E at its opposite side. Openings 31 in the wall of shell 28 provide communication between spaces S and E for purposes presently to be described.

An inlet nozzle 33, preferably having a lining 34, is secured as by welding or the like at 35 about an opening 36 provided in shell 10 and its lining 15 and communicates with the annular space S. An outlet nozzle 37 preferably having a lining 38 is secured as by welding or the like at 39 about an opening 40 communicating with space S. An inner shell or tube 41 of smaller diameter than lining 38 and defining with it an annular space passageway H extends from the outer end of nozzle 37 inwardly and is secured as by welding or the like at 42 about an opening 43 in shell 28 which communicates with space D of the latter. Thus all internal surfaces of the shell 10 and its ends are in surface contact with air or fluid at its cool entering temperature and the shell 10 remains substantially at this temperature during use.

Transversely extending metallic tube supports 45 each fitting within an annular recess of a peripheral supporting ring 46 are positioned at spaced apart points within the shell 28, the rings 46 fitting snugly but movably the internal diameter of shell 28. The particular ring 46 of the tube support 45 in closest proximity to partition 30 abuts an annular segmental ring 47′ secured as by lugs 47 or the like to the inner surface of shell 28. This ring 47′ serves as a limit stop. The outermost supporting ring 45 adjacent the opposite end of shell 28 is provided with longitudinally extending expansion rods 48 which fit slidably in openings provided in guide flanges 49 soldered or the like to the shell 28.

Each tube support 45 has a like number of identically arranged openings 50 (Fig. 4) in each of which a tubular bushing 51 of electric insulating material is mounted. Tubes 52 of electrical resistor material, for example, nickel-chromium alloy, or other equivalent electric resistor material are threaded longitudinally through axially aligned bushings 51 in the respective tube supports 45, one end of each tube 52 communicating with chamber C, and the opposite end of each tube 52 communicating with chamber D. The tube support plates 45 fit rings 46, and the latter fit the inner surface of shell 28 and, similarly, bushings 51 fit openings 50 and tubes 52 fit bushings 51 sufficiently closely to limit leakage of air from space C to space D through space F to a very small quantity, but the fits are not close enough to prevent relative expansion or contraction of parts.

The ends of all resistor tubes 52 projecting into chamber C in each horizontal row of tubes (Fig. 6) are electrically interconnected by distributors 53 and all the latter are electrically connected to a bus 54 which in turn is connected by a metal conductor 55 to a terminal 56 carried by an insulator 57 that in turn extends outwardly of the lining 15 and shell 10 through an opening that is sealed appropriately around its edges at 58. The other ends of all tubes 52 projecting into chamber D in each horizontal row are electrically interconnected by distributors 59, and the latter are electrically connected to a bus 60 which is, for example, grounded by connection at 61 with the shell 28 which latter is connected electrically by the weld at 42 to the shell 41 which is in contact with the grounded outlet nozzle 37.

All the tubes 52 are thus connected in electrical parallel and may be supplied from a common power source P connected to the terminal 56 and to ground. Appropriate voltage and current controls (not shown) are connected in the power circuit in the usual manner. While electrical parallel connection for tubes 52 is shown, it is to be understood that the electrical connection of the tubes 52, also, may be either series or series-parallel depending upon the type of electric power available at the place of use, the requirement being that electric current flow in the tubes will be sufficient to heat them to necessary temperatures to produce desired heating of the air or other fluid flowing through the resistor tubes 52.

Operation

Electrical power P is connected to the tubes 52 as described. Air is introduced through nozzle 33 and is first directed to flow in space S between lining 15 and shell 28 has an envelope of air to maintain substantially uniform temperature of the outer shell 10 and its lining 15 to space or chamber C whence it flows through each of the electrically heated tubes 52 to space or chamber D being heated in its passage through the tubes. From chamber D the heated air flows outwardly through tube 41 in nozzle 37. A small portion of the cold air entering nozzle 33 also flows from passage S through some of the openings 31 into space or chamber E and from the latter outwardly through others of the openings 31 and through the annular space H and rejoins the heated air flowing in tube 41 through openings 41b in the wall of the latter. The cool air in chamber E and in space H acts to keep the hot end of shell 10 and outlet nozzle 37 at substantially the same uniform temperature as shell 10.

Although the invention has been described as an air heater, it is not limited in its application to air. Any fluid having proper dielectric properties can be heated in the exchanger described. The heater constructed and operated as described embodies all features outlined at the outset of this specification. The shell 28, members 45 and partition 30 act as baffles to direct the air or fluid in proper direction as described.

Modification

With slight modification, and without the use of electric heating, the device can be utilized to provide heat exchange between any cold and any hot fluid. In such case, the material of tubes 52 need not be of electric resistor material, but may be of any other metal. Electric connections to the tubes can be eliminated and the end tube supports 45 and their rings 46 provide leak proof seals at opposite ends of tubes 52 and shell 28 so that compartment or chamber F is sealed off from chambers C and D. An inlet nozzle and an outlet nozzle each communicating with chamber F are provided. One of the two fluids is circulated via nozzle 33 through space S, chamber C, tubes 52, chamber D and outlet nozzle 37 as previously described. The other of the two fluids is fed into chamber F around the external surfaces of tubes 52 in heat exchange relationship with the fluid flowing through the latter tubes and finally out through the second outlet nozzle. Relative flow of the two fluids may be in countercurrent direction or the same direction as desired.

While specific embodiments of the invention have been disclosed, variations in structural detail within the scope of the claims are possible and are contemplated. There is no intention therefore of limitation to the exact details shown and described.

What is claimed is:

1. Apparatus for heating air or other fluids comprising an outer elongated shell, removable cover members at opposite ends of said shell, means for securing said cover members in fluid-tight relationship with the outer shell, an inner shell supported within and extending longitudinally of the outer shell, the inner shell being so dimensioned and positioned within the outer shell as to define a fluid flow passageway around the inner shell between the inner surface of the outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, tubes carried by said supports and extending in spaced relationship with one another longitudinally through the inner shell with their opposite ends extending into the respective inlet and outlet chambers, electrical connections interconnecting all the tubes at one end to a common conductor, electrical connections interconnecting all the tubes at the other end to a second common conductor, and means for connecting the said common conductors to a source of electric power whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the outlet nozzle.

2. Apparatus for heating air or other fluids comprising a cylindrically shaped outer shell, removable cover members at opposite ends of said shell, means for securing said cover members in fluid-tight relationship with the outer shell, a cylindrically shaped inner shell supported within and extending axially of the outer shell, the inner shell being of a lesser diameter than and so positioned within the outer shell as to define a fluid flow passageway around the inner shell between the inner surface of the outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, tubes carried by said supports and extending in spaced relationship with one another longitudinally through the inner shell with their opposite ends extending into the respective inlet and outlet chambers, electrical connections interconnecting all the tubes at one end to a common conductor, electrical connections interconnecting all the tubes at the other end to a second common conductor, and means for connecting the said common conductors to a source of electric power whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the outlet nozzle.

3. Apparatus for heating air or other fluids comprising an outer elongated shell, removable cover members at opposite ends of said shell, means for securing said cover members in fluid-tight relationship with the outer shell, an inner shell supported within and extending longitudinally of the outer shell, the inner shell being so dimensioned and positioned within the outer shell as to define a fluid flow passageway around the inner shell between the inner surface of the outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, said outlet nozzle comprising an inner sleeve so dimensioned and positioned within the nozzle as to define a flow path around said sleeve between the outer periphery thereof and the nozzle, said sleeve being in communication at the inlet end thereof with the heated fluid compartment and at the outlet end with the nozzle outlet, the flow path being in communication at one end thereof with said fluid passageway to receive fluid therefrom and at the opposite end with said nozzle outlet, tubes carried by said supports and extending in spaced relationship with one another longitudinally through the inner shell with their opposite ends extending into the respective inlet and outlet chambers, electrical connections interconnecting all the tubes at one end to a common conductor, electrical connections interconnecting all the tubes at the other end to a second common conductor, and means for connecting the said common conductors to a source of electric power whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the inner sleeve of the outlet nozzle.

4. Apparatus for heating air or other fluids comprising an outer elongated shell, removable cover members at opposite ends of said shell, means for securing said cover members in fluid-tight relationship with the outer shell, an inner shell supported within and extending longitudinally of the outer shell, the inner shell being so dimensioned and positioned within the outer shell as to define a fluid flow passageway around the inner shell between the inner surface of the outer shell and the outer surface of the inner shell, tube supports spaced from one another and spanning in a fluid-tight manner the cross-section area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, tubes carried by said supports and extending in spaced relationship with one another longitudinally through the inner shell with their opposite ends extending into the respective inlet and outlet chambers, electrical connections interconnecting all the tubes adjacent one end of the outer shell to a common conductor, electrical connections interconnecting all the tubes adjacent the other end of said shell to a second common conductor, means at said one end of the outer shell and extending into said inlet chamber for connecting the common conductor at said one end to a source of electric power, and means for connecting the common conductor at said other end to the source, whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the outlet nozzle.

5. Apparatus for heating air or other fluids comprising a cylindrically shaped outer shell, removable cover members at opposite ends of said shell, means for securing said cover members in fluid-tight relationship with the outer shell, a cylindrically shaped inner shell supported within and extending axially of the outer shell, the inner shell being of a lesser diameter than and so positioned within the outer shell as to define a fluid flow passageway around the inner shell between the inner surface of the outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, said outlet nozzle comprising an inner sleeve so dimensioned and positioned within the nozzle as to define a flow path around said sleeve between the outer periphery thereof and the nozzle, said sleeve being in communication at the inlet end thereof with the heated fluid compartment and at the outlet end with the nozzle outlet, the flow path being in communication at one end thereof with said fluid passageway to receive fluid therefrom and at the opposite end with said nozzle outlet, tubes carried by said supports and extending in spaced relationship with one another longitudinally through the inner shell with their opposite ends extending into the respective inlet and outlet chambers, electrical connections interconnecting all the tubes adjacent one end of the outer shell to a common conductor, electrical connections interconnecting all the tubes adjacent the other end of said shell to a second common conductor, means at said one end of the outer shell and extending into said inlet chamber for connecting the common conductor at said one end to a source of electric power, and means for connecting the common conductor at said other end to the source, whereby said tubes may be heated electrically and whereby the fluid to be heated will be directed from the inlet nozzle through the fluid passageway in surface contact with the inner and outer shells and into said inlet chamber, then through the tubes being heated in flow therethough, and into said heated fluid outlet compartment chamber and thereafter through the inner sleeve of the outlet nozzle.

*6. Apparatus for heating air or other fluids comprising an outer elongated shell enclosed at the opposite ends thereof, at least one of said opposite ends being closed by a removable cover member, means for securing said removable cover member in fluid-tight relationship with the outer shell, an inner shell supported within and extending longitudinally of the outer shell, the inner shell being so dimensioned and positioned within the outer shell as to define a fluid flow passageway around the inner shell between the inner surface of the outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, tubes carried by said supports and extending in spaced relationship with one another longitudinally through the inner shell with their opposite ends extending into the respective inlet and outlet chambers, electrical connections interconnecting all the tubes at one end to a common conductor, electrical connections interconnecting all the tubes at the other end to a second common conductor, and means for connecting the said common conductors to a source of electric power whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the outlet nozzle.*

*7. Apparatus for heating air or other fluids comprising a cylindrically shaped outer shell, cover members at opposite ends of said shell, at least one of said cover members being removable, means for securing said removable cover members in fluid-tight relationship with the outer shell, a cylindrically shaped inner shell supported within and extending axially of the outer shell, the inner shell being of a lesser diameter than and so positioned within the outer shell as to define a fluid flow passageway around the inner shell between the inner surface of the outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, tubes carried by said supports and extending in spaced relationship with one another longitudinally through the inner shell with their opposite ends extending into the respective inlet and outlet chambers, electrical connections interconnecting all the tubes at one end to a common conductor, electrical connections interconnecting all the tubes at the other end to a second common conductor, and means for connecting the said common conductors to a source of electric power whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the outlet nozzle.*

*8. Apparatus for heating air or other fluid comprising an outer elongated shell, cover members at opposite ends of said shell, at least one of said cover members being removable, means for securing said removable cover member in fluid-tight relationship with the outer shell, an inner shell supported within and extending longitudinally of the outer shell, the inner shell being so dimensioned and positioned within the outer shell as to define a fluid flow passageway around the inner shell between the inner surface of the*

*outer shell and the outer surface of the inner shell, tube supports spaced from one another and spanning in a fluid-tight manner the cross-sectional area of the inner shell and in spaced relationship with the opposite ends of the outer shell, one of the tube supports defining one side of a fluid inlet chamber within the outer shell between one end of said outer shell and said one support, the inlet chamber being in communication with the fluid passageway, a partition spanning the cross-sectional area of the inner shell intermediate the opposite end of the outer shell and the other tube support, thereby defining one end of a heated fluid outlet compartment between said other tube support and the partition and a cool fluid space between said opposite end of the outer shell and said partition, the cool fluid space being in communication with said fluid flow passageway to receive fluid therefrom, a fluid inlet nozzle in communication with the fluid flow passageway adjacent said opposite end, a fluid outlet nozzle in communication with the outlet compartment at said opposite end, said outlet nozzle comprising an inner sleeve so dimensioned and positioned within the nozzle as to define a flow path around said sleeve between the outer periphery thereof and the nozzle, said sleeve being in communication at the inlet end thereof with the heated fluid compartment and at the outlet end with the nozzle outlet, the flow path being in communication at one end thereof with said fluid passageway to receive fluid therefrom and at the opposite end with said nozzle*

*outlet, tubes carried by said supports and extending in spaced relationship with one another longitudinally through the inner shell with their opposite ends extending into the respective inlet and outlet chambers, electrical connections interconnecting all the tubes at one end to a common conductor, electrical connections interconnecting all the tubes at the other end to a second common conductor, and means for connecting the said common conductors to a source of electric power whereby said tubes may be heated electrically and whereby the fluid to be heated will be directed from the inlet nozzle through the fluid passageway in surface contact with the inner and outer shells and into said inlet chamber, then through the tubes being heated in flow therethrough, and into said heated fluid outlet compartment chamber and thereafter through the inner sleeve of the outlet nozzle.*

JOHN W. CARTINHOUR.

References Cited in the file of this patent or the original patent

UNITED STATES PATENTS

| Number | Name | Date |
|---|---|---|
| 1,356,818 | Hadaway | Oct. 26, 1920 |
| 1,615,166 | Cowles | Jan. 18, 1927 |
| 1,727,584 | Carleton | Sept. 10, 1929 |
| 1,787,801 | Swoboda et al. | Jan. 6, 1931 |
| 1,926,958 | Peterson | Sept. 12, 1933 |
| 1,985,280 | Carleton | Dec. 25, 1934 |